J. M. KELLER.
SLIP GEAR.
APPLICATION FILED NOV. 8, 1912.
1,067,034.
Patented July 8, 1913.
2 SHEETS—SHEET 2.
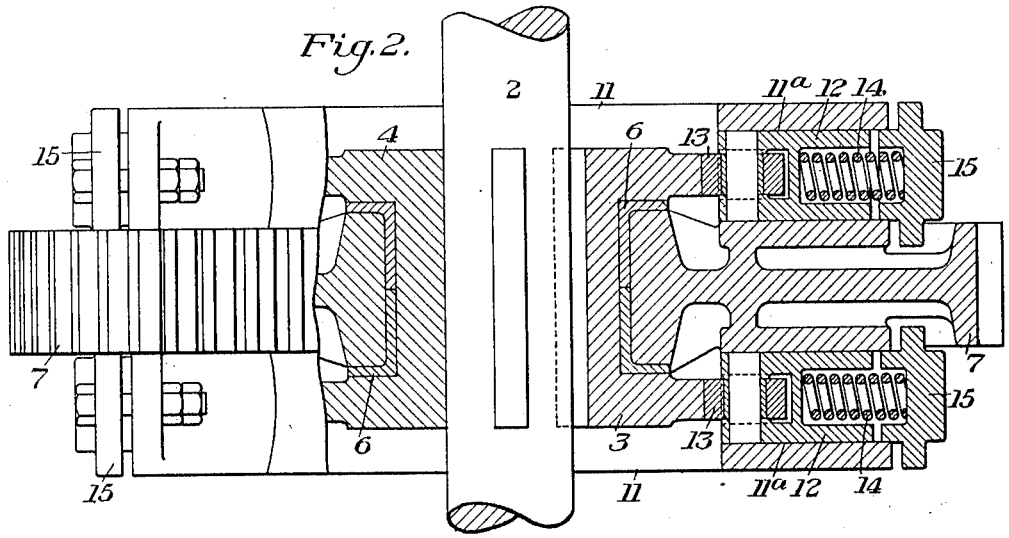
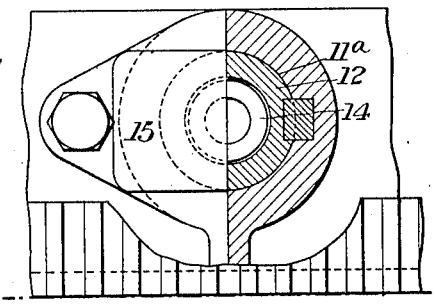
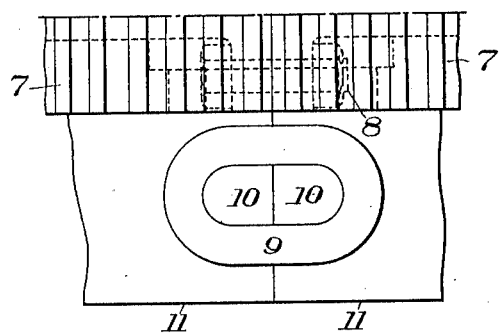
WITNESSES
INVENTOR

UNITED STATES PATENT OFFICE.

JOHN M. KELLER, OF YOUNGSTOWN, OHIO, ASSIGNOR TO THE WILLIAM TOD COMPANY, OF YOUNGSTOWN, OHIO, A CORPORATION OF OHIO.

SLIP-GEAR.

1,067,034.

Specification of Letters Patent.

Patented July 8, 1913.

Application filed November 8, 1912. Serial No. 730,183.

*To all whom it may concern:*

Be it known that I, JOHN M. KELLER, a resident of Youngstown, Mahoning county, Ohio, have invented a new and useful Improvement in Slip-Gears, of which the following is a full, clear, and exact description, reference being had to the accompanying drawings, forming part of this specification, in which—

Figure 1 is a front elevation, partly in section, of a slip gear embodying my invention; Fig. 2 is a view of the same partly in plan and partly in section; and Figs. 3 and 4 are detail views hereinafter more specifically referred to.

My invention has relation to slip gears; and is designed to provide a simple and efficient form of such gears which can be used for a variety of purposes.

The nature of my invention will be best understood by reference to the accompanying drawings, in which I have illustrated the preferred embodiment thereof, and which will now be described, it being premised, however, that various changes can be made in the details of construction and arrangement of the parts without departing from the spirit and scope of my invention as defined in the appended claims.

In these drawings, the numeral 2 designates a driven shaft. 3 is a hub member keyed or otherwise rigidly secured to said shaft, and having a flange 4 at each end portion thereof. The peripheral faces of these flanges are fluted or corrugated, as indicated at 5 in Fig. 1.

6 is a bushing seated on the hub member 3 between its end flanges, and upon which is rotatably sleeved a spur gear wheel 7. This gear wheel is formed in two half sections, which are shown as secured to each other by means of the bolts 8, and also by means of the clamping rings 9, which are shrunk over abutting projections 10 on opposite faces of the two sections. One of these clamping rings, and the manner in which it is engaged with the gear wheel section, is shown in detail in Fig. 4. I preferably employ two sets of these clamping rings arranged in planes at right angles to each other. Thus, in Fig. 1 one set of these rings is shown as engaging lateral projections 10 on the sections, and another set is shown as engaging radial projections 10 of the sections.

The gear wheel is formed with a flange portion 11 at each side thereof, each of these flange portions carrying a plurality of hollow radial arms or pockets 11ª. Seated in each of these pockets is a movable support 12, in which is journaled a roller 13 whose periphery is adapted to engage the flutes or corrugations of one of the flanges 4 of the hub member 3. These rollers are held in engagement by means of the springs 14 seated in pockets of the carriers 12 and against the removable caps 15. In the particular arrangement shown, there are four of these rollers at each side of the wheel, or eight in all, but obviously a greater or less number may be employed as may be desired.

The operation will be readily understood. Under normal conditions, the hub member and gear wheel will rotate as a unit, the springs 14 being of sufficient strength to prevent slippage under normal loads. When, however, the load on the gear wheel exceeds the predetermined maximum, the rollers 13 will yield against the springs 14 and permit the gear wheel to slip on the hub member 3.

My invention provides a slip gear, which is simple in its construction and operation; which can be readily constructed; and which is of a durable character and adapted to transmit a large amount of power without breakage.

What I claim is:—

1. A slip-gear comprising a hub member and a concentric gear member, one of said members having spring pressed pawl devices, and the other member having corrugations engaged by the pawl devices, said pawl devices and corrugations having substantially concentric engaging surfaces which present substantially the same resistance to disengagement in both directions of rotation of said members and whereby slippage of one member relatively to the other in both directions under excess pressure is permitted; substantially as described.

2. A slip gear comprising a hub member having corrugated flanges at opposite end portions thereof, a gear wheel rotatably sleeved on the hub member between its said flanges, and a plurality of spring-pressed pawl devices carried by the gear wheel at opposite sides thereof and adapted to engage the corrugations of said flanges; substantially as described.

3. A slip gear comprising a hub member having a peripherally corrugated flange at each end portion thereof, and a sectional gear wheel sleeved on the hub member between the corrugated flanges, said gear having upon each of its lateral faces a plurality of hollow radial arms or pocket members and movable spring-pressed roller carriers seated in said arms or members and having rollers adapted to engage the corrugations of said flanges; substantially as described.

In testimony whereof, I have hereunto set my hand.

JOHN M. KELLER.

Witnesses:
L. H. E. LOWRY,
L. A. WOODARD.

Copies of this patent may be obtained for five cents each, by addressing the "Commissioner of Patents, Washington, D. C."